United States Patent [19]
Haworth

[11] Patent Number: 5,085,375
[45] Date of Patent: Feb. 4, 1992

[54] LEAF MULCHER

[75] Inventor: Edward M. Haworth, Woodstock, Ill.

[73] Assignee: Cotter & Company, Chicago, Ill.

[21] Appl. No.: 632,005

[22] Filed: Dec. 21, 1990

[51] Int. Cl.$^5$ .......................................... B02C 18/12
[52] U.S. Cl. ...................................... 241/55; 241/92; 241/282.2
[58] Field of Search ............ 241/55, 56, 282.1, 282.2, 241/92

[56] References Cited

U.S. PATENT DOCUMENTS

| | | |
|---|---|---|
| 3,190,566 | 6/1965 | Cressy et al. |
| 3,593,930 | 7/1971 | Lautzenheiser ................. 241/188 R |
| 4,270,271 | 6/1981 | Feldman et al. ...................... 30/276 |
| 4,360,166 | 11/1982 | Biersack ................................ 241/92 |
| 4,477,029 | 10/1984 | Green ............................... 241/101.7 |
| 4,593,863 | 6/1986 | Mordstein et al. .................... 241/92 |
| 4,595,148 | 6/1986 | Luerken et al. ....................... 241/92 |
| 4,682,740 | 7/1987 | Conigliaro et al. ............... 241/282.1 |
| 4,778,117 | 10/1988 | Karg ..................................... 241/92 |
| 4,984,747 | 1/1991 | Lechner ................................ 241/55 |

FOREIGN PATENT DOCUMENTS

| | | | |
|---|---|---|---|
| 2802150 | 5/1979 | Fed. Rep. of Germany ........ 241/55 |
| 1271446 | 11/1986 | U.S.S.R. ........................... 241/282.1 |

*Primary Examiner*—Mark Rosenbaum
*Assistant Examiner*—John M. Husar
*Attorney, Agent, or Firm*—Edward D. Gilhooly

[57] ABSTRACT

A mulcher for shredding leaves and other vegetation having a plurality of pivoted plastic cutting blades. The material being shredded is introduced into an upper hopper having a plurality of spaced baffle plates. The hub supporting the cutting blades includes fan bldes for generating a flow through the mulcher to recirculate shredded material past the cutting blades for increased fineness of cut.

19 Claims, 4 Drawing Sheets

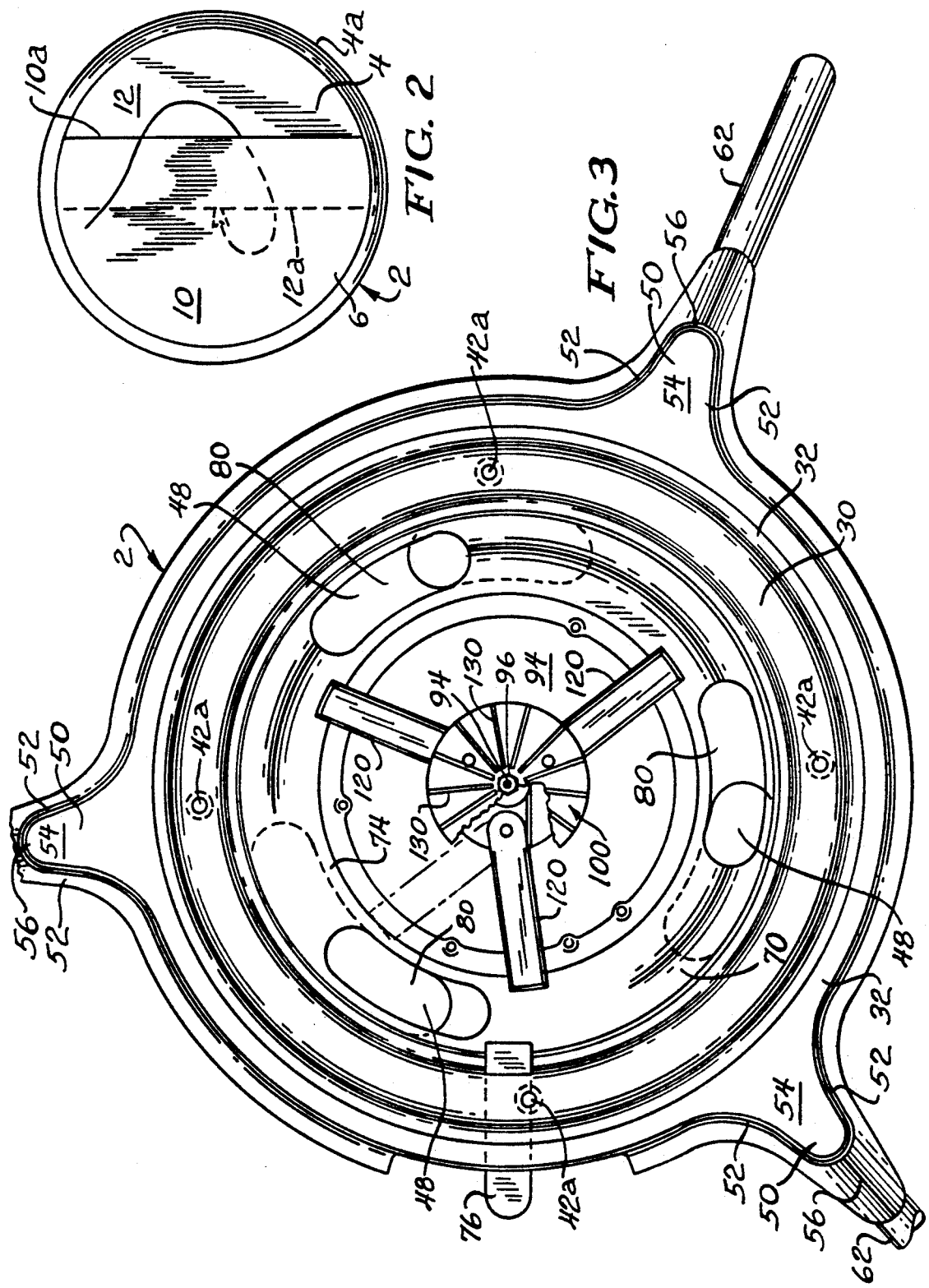

LEAF MULCHER

BACKGROUND OF THE INVENTION

1. Field of the Invention

This invention relates to mulching apparatus and more particularly, to an improved mulcher for shredding leaves or other similar yard and garden refuse.

2. Description of the Prior Art

In recent years the need for effective techniques for disposing of leaves and other yard and garden refuse has intensified. Communities have introduced stringent regulations concerning the burning of refuse. Severe shortages of available areas for landfill further exists causing locales to refuse to pick up leaves and other such material in ordinary refuse collection or to permit the dumping of such waste in the community.

One alternative to the problems associated with burning or landfill in disposing of garden and yard refuse lies in the use of various mulching techniques. Mulching or shredding of vegetation shreds the material to smaller pieces that can be more densely packed for disposal or be used as compost material. Some free standing mulchers for shredding leaves and similar material have been developed in the past. Examples of such leaf shredders are disclosed in U.S. Pat. No. 4,682,740 to Conigliaro et al issued July 28, 1987; U.S. Pat. No. 3,190,566 to Cressy et al issued June 22, 1965; and U.S. Pat. No. 4,360,166 to Biersack issued Nov. 23, 1982. These prior art shredders either employ flexible lines as a shredder element in the case of the foregoing Conigliaro patent or metal blades in the designs of the other of the patents. Shredding elements made from flexible line are subject to continual breaking during use, while metal blades are relatively uneconomical and can create safety hazards under certain circumstances.

Known leaf mulchers further do not permit the efficient and safe shredding of leaves and similar material, whether in dry or wet condition. In addition, present designs do not attain an effective flow of the vegetation being shredded to insure optimum feed, shredding to a desired fine cut, and effective discharge of shredded material. For these reasons and others not specifically herein outlined, it is desirable to provide an improved mulcher to shred leaves and other garden and yard refuse in an effective manner.

SUMMARY OF THE INVENTION

It is therefore an objective of the invention to provide an improved mulcher for shredding vegetation, such as leaves. The mulcher of the invention includes a hopper inlet having multiple baffle means for the efficient and safe delivery of leaves or other material to the shredder elements. The baffle means prevents accidental entry of the user's hand to the mulching blades and prevents material from climbing out of the hopper. The shredder elements herein disclosed are designed with a unique construction for highly effective shredding. The hub of the rotor for the shredding elements includes novel fan means for creating an improved flow pattern that expedites the flow of material through the baffle means and cutting elements with efficient discharge. The fan means also creates a recirculation of refuse through the blades for a finer cut.

The mulcher of the invention is provided with discharge openings oriented radially beyond the cutting blades that insure effective discharge and are adjustable to control the fineness of the cut. The mulcher blade elements are constructed from a light weight plastic and are uniquely mounted to alleviate breaking of the blade and overloading of the motor in presence of immovable objects, such as rocks, sticks and the like, or in the event of overpacking. The improved air pattern from the blades of the invention creates a vortex that causes the material being mulched to re-enter the blade path and be recut many times. The discharge openings extend out from the blade tips and extend up the outer wall to exploit the vortex action for discharge. The invention herein disclosed achieves the improved foregoing functions for efficient mulching with an apparatus that is economical, lightweight and easy to operate.

BRIEF DESCRIPTION OF THE DRAWINGS

FIG. 2 is a top plan view of the mulcher of FIG. 2;

FIG. 3 is a top plan view, with parts in section taken along lines 3—3 of FIG. 1;

DESCRIPTION OF THE PREFERRED EMBODIMENT

Figure 1:
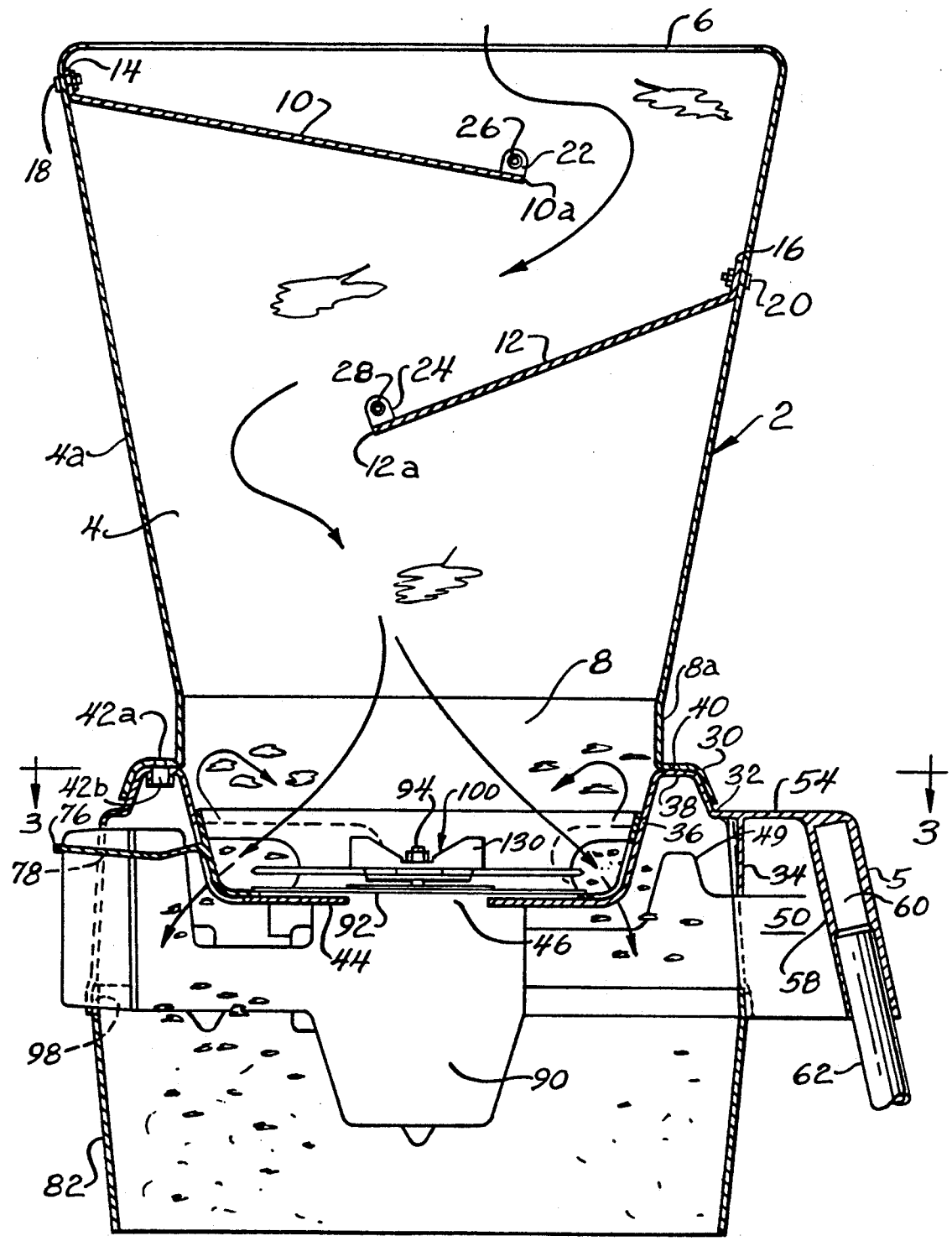
FIG. 1 is a partial side elevational view, with parts in section, of the mulcher of the invention.

Referring now to FIG. 1, there is illustrated the mulcher of the invention, generally designated by reference numeral 2. The mulcher 2 is capable of shredding leaves or other garden and yard vegetation to a selected fineness for discharge. Mulcher 2 includes an upper hopper 4 defined by an upright wall 4a having a generally truncated conical configuration and fabricated from a plastic material and the like. The hopper 4 forms an upper inlet 6 for introducing material to be shredded. The diameter of hopper 4 gradually decreases inward from inlet 6 down to a bottom feed opening 8 to introduce material being shredded to cutting elements. The feed opening 8 is defined by a lower generally cylindrical portion 8a of the hopper 4.

As seen in FIGS. 1 and 2, a pair of vertically spaced baffle plates 10 and 12 having an approximately semicircular cross section are internally mounted within hopper 4 beneath feed inlet 6. Each of baffle plates 10 and 12 respectively includes vertically oriented flanges 14 and 16 to enable fasteners 18 and 20 to affix the baffle plates 10 and 12 to hopper 4. A pair of lower flanges 22 and 24 are respectively provided on baffle plates 10 and 12 to further attach them to hopper 4 by fasteners 26 and 28 as seen in FIG. 2. As is clear from FIG. 1, the flanges 14 and 16 are respectively disposed in elevated relationship to flanges 22 and 24 to orient the baffles 10 and 12 in an inclined slope to permit to guide the material downward. Each baffle 10 and 12 includes a respective free edge 10a and 12a that defines openings through which the vegetation passes in its circuitous flow path through hopper 4 as is shown by arrows in FIG. 1. The free edges 10a and 12a of baffle plates 10 and 12 are disposed in overlapping relationship when viewing the plan view of FIG. 2 to prevent the user from reaching downward into the hopper 4 for possible injury and to prevent material from being ejected upward during operation.

Figure 7:
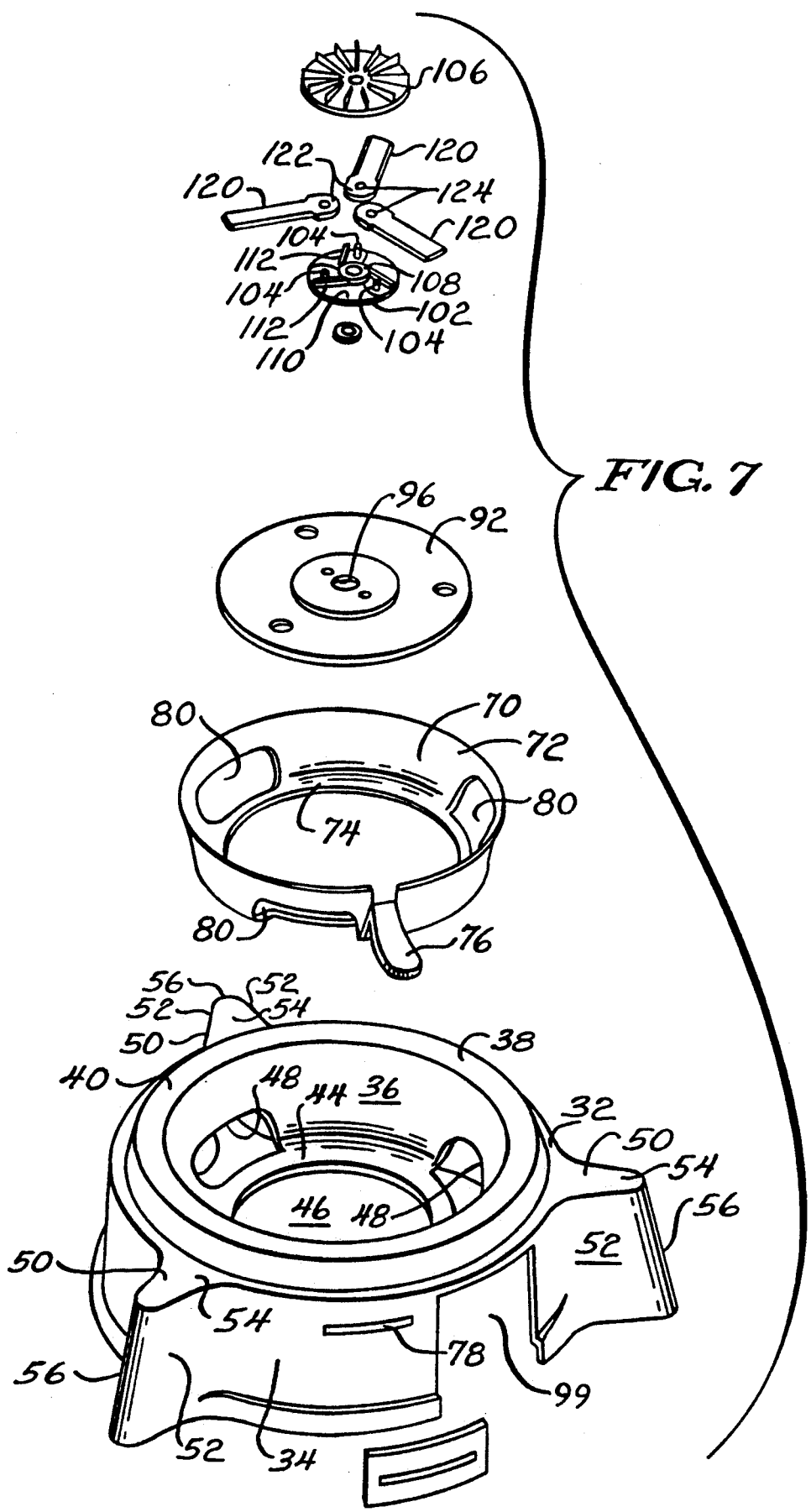
FIG. 7 is a perspective side view of the housing and blade rotor assembly of the mulcher of FIG. 1.

As best illustrated in FIGS. 1, 3, and 7, a lower continuous flange 30 of hopper 4 contacts an upper portion of a one-piece base 32. The base 32 is essentially defined by an outer annular wall 34, a spaced inner annular wall 36 and an integral upper portion 38. The upper portion 38 has an inverted modified 2-shaped configuration in cross section forming an upper surface 40 contacting flange 30 of hopper 4. A suitable number of threaded assemblies (not shown) are mounted through holes 42a, 42b that are circumferentially arranged through flange 30 and upper portion 38 for removable attachment of the hopper 4 to base 32. A circumferentially extending annular ridge 44 is inwardly formed at the bottom of inner wall 36 to define a lower opening 46. A plurality of material discharge ports 48 extend through inner housing side wall 36 immediately adjacent ridge 44. The lower edge of outer wall 34 projects downward below ridge 44 for radially confining the outward flow of discharged material through discharge port 48 to a downward direction in the housing chamber 49 as caused by the spaced radial relationship of outer wall 34 and inner wall 38 (FIG. 1). Although any number of discrete material discharge ports 48 may be formed through inner wall 36 as desired, three ports 48 are shown in FIG. 3. Three leg supporting projections 50 are formed on outer side wall 34 by spaced, generally radially extending portions 52 that are joined by integral top section 54 and downwardly disposed U-shaped peripheral sections 56. An inner wall section 58 (FIG. 1) integrally forms a downwardly opening leg sleeve 60 in conjunction with peripheral section 56 at each of the outward portions 52 as seen in FIG. 1. A support leg 62 is removably mounted in each of the sleeves 60 for freestanding support of mulcher 2.

A bowl 70 is positioned for relative movement within base 32 for controlling the size of discharge part 48 as seen in FIGS. 1, 2, and 7. The bowl 70 includes a circumferentially extending continuous wall 72 and lower edge 74 both possessing an outer configuration conforming to the shape of the lower portion of inner wall 36 and ridge 44 of base 32. An adjustment handle 76 integrally projects from wall 72 and extends through one of the discharge ports 48 and slot 78 provided in outer wall 34 of base 32. A portion 80 of handle 76 protrudes externally to permit the user to move the handle 76 relative to slot 78 and thus shift the position of bowl 70 relative to base 32. Referring to FIGS. 3 and 7, it should be apparent that wall 72 includes three material discharge openings 80 generally corresponding to discharge openings 48 of base 32. By shifting the bowl 70 relative to base 32, the extent of the effective discharge opening through bowl 70 and base 32 can be adjusted within a selected range. An increase of the size of the effective material discharge opening will increase the size of the shredded material being discharged, while a smaller effective opening will increase the fineness of the cut. A generally cylindrical skirt 82 is affixed to the bottom of the outer wall 34 to guide discharged material downward.

As seen in FIG. 1 a motor housing 90 is suitably suspended by motor mount plate 92 affixed to the ridge 44. A cutting blade drive shaft 94 extends from motor housing 90 through opening 96 provided in plate 94. The housing 90 encloses a suitable electric motor and the like (not shown) and extends radially outward through a cut out portion 98 in the outer wall 34 of housing 32. A motor switch and filter (not shown) may be operatively connected to housing 90 for external access.

Referring to FIGS. 1, 3, and 4 to 6, details of cutting blade rotor assembly 100 are illustrated. The cutting blade rotor assembly 100 is constructed with a lower hub 102 having a plurality of blade retaining pins 104 and an upper retainer hub 106. The hubs 102 and 106 may be both molded from a suitable plastic or formed from other material, if desired. A raised circular portion 108 is formed on the top surface 110 of lower hub 102 along with three ridges 112 projecting outward to the periphery of lower hub 102. The ridges 112 have a linear configuration and project symmetrically outward in a near tangential relationship to the raised circular portion 108. The upper surfaces of ridge 112 and circular portion 108 act to contact the under side of upper hub 106 and establish an open area between lower hub 102 and upper hub 106 to receive and retain a plurality of cutting blades 120, such as three in number as shown in FIGS. 3, 4, 6, and 7. The blades 120 may also be fabricated from plastic by a suitable production technique, although the blades 120 may consist of other alternate materials if appropriate.

Figure 4:
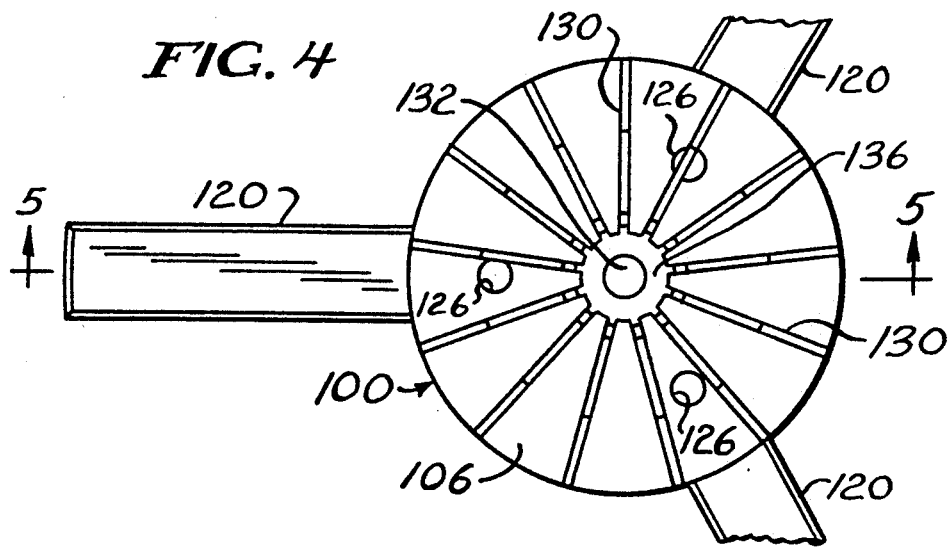
FIG. 4 is a partial top plan view of the mulching blade rotor shown in the mulcher of FIG. 1.
Figure 5:
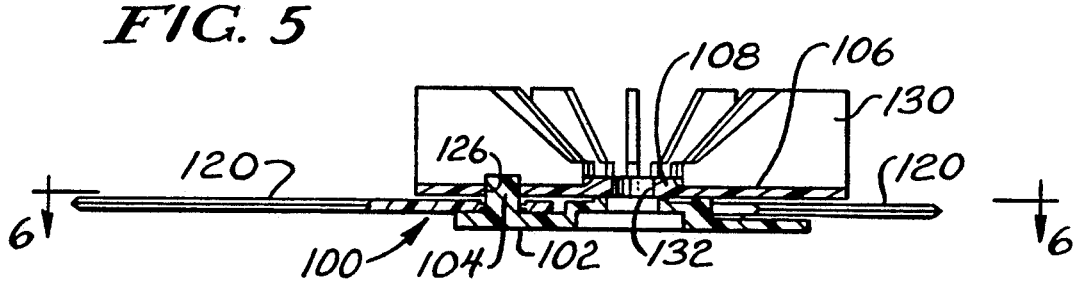
FIG. 5 is a side elevation view, with parts in section, taken along lines 5—5 of FIG. 4.

As further seen in FIGS. 1 and 3, 4 to 7, the cutting blades 120 are flat in shape having a base 122. The base 122 includes a hole 124 for removably mounting a blade 120 on a respective retaining pin 104. The leading and trailing edges of each blade 120 may include a tapered cross-section to form a more effective cutting element. The retaining pins 104 are arranged to be inserted into corresponding holes 126 in upper hub 106 in an assembled configuration (FIGS. 4 and 5).

Figure 6:
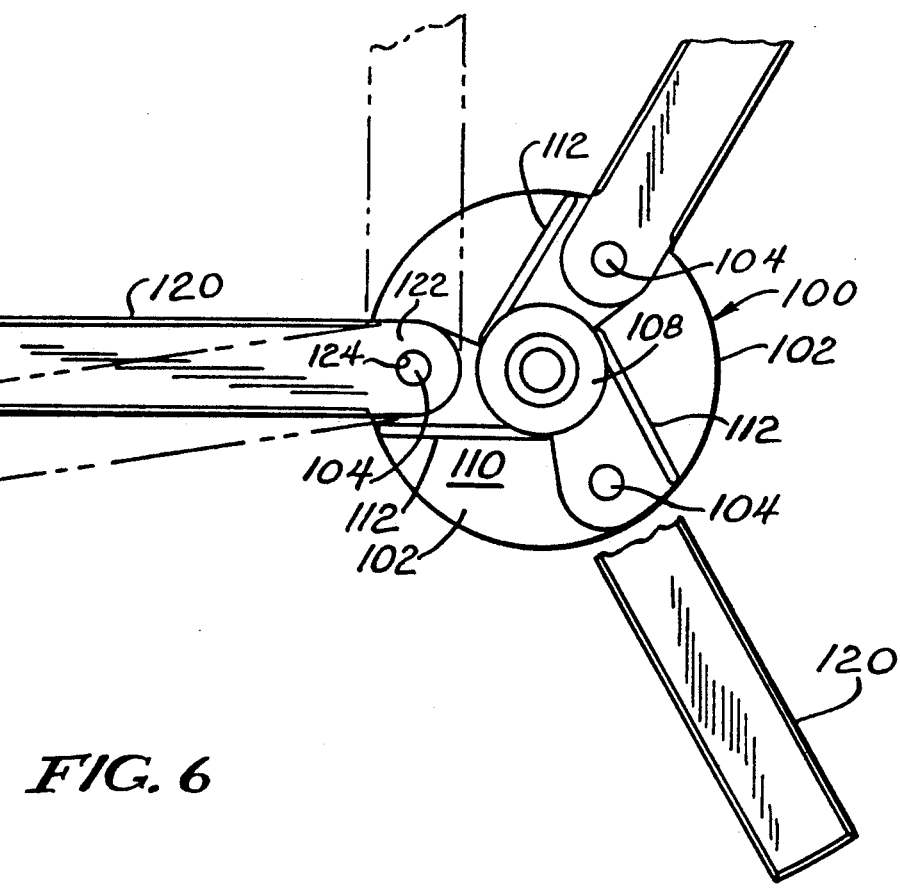
FIG. 6 is top plan view, with parts removed, of the blade rotor of FIG. 4.

As should be apparent, the pin mounting of cutting blades 120 permits automatic pivotal action of the blades to minimize the effect of the impact of hard or impacted material during cutting. Under normal circumstances, rotation of the rotor assembly 100 causes the blades 120 to assume a generally radial orientation due to centrifugal force, such as shown in FIG. 6. But if a non-yielding or compacted material is contacted during rotation, the pivotal mounting of cutting blades 120 responds to the force so that blade 120 moves from its radial position to an angular relationship, the latter position being limited by contact with ridge 112 as illustrated in phantom in FIG. 4.

A plurality of integral vane or fan blades 130 are vertically arranged around the upper surface of upper hub 106 about a hole 132 which receives the threaded output shaft 94 of the motor from motor housing 90. The fan blades 130 extend outwardly from a nut receiving area 136 (FIG. 4) surrounding hole 132 and are formed with upwardly slope upper edges in their interior portion (FIG. 5). The upper edges of the remaining outer portion of fan blades 130 extend parallel to hub 106 to its outer periphery.

The cutting blade rotor assembly 100 is retained on threaded motor output shaft 94 by a typical nut element 140 (FIGS. 1 and 3), which is positioned in area 136 on upper hub 106. The cutting blades 120 can easily be removed for replacement, if damaged, by removal of nut element 140 and separation of lower and upper rotor hubs 102 and 106. The fan blades 130 create an air circulation as generally indicated by arrows in FIG. 1. The flow generated from blades 130 expedites the flow of material to be shredded past baffle plates 10 and 12 for efficient delivery to the cutting blade rotor assembly 100. The fan blades 130 further create a recirculation of material being shredded through blades 130 for attaining a finer cut. As best seen in FIG. 3, the discharge openings 80 are positioned radially beyond the outermost tips of the cutting blades 120. The tips of the cutting blades 120 generate a vortex during rotation to cause recirculation of the material being shredded back through the cutting blades 120 for a finer cut. The vortex of the blades also facilitates discharge of the shredded material through discharge opening 80 and through the housing 32 for collection or dispersal. As stated previously, the effective size of the discharge opening is controlled by relative positions of bowl 70 to base 32. Shredded leaves and the like may be collected in plastic bags (not shown) disposed beneath skirt 82 or in containers (not shown) on which mulcher 2 is positioned.

What is claimed is:

1. A mulcher for shredding vegetation comprising
housing means including an upright upper hopper, said hopper having an upper inlet for introducing vegetation to be shredded in said housing means,
blade assembly means being mounted in said housing means beneath said upper hopper for shredding vegetation being introduced,
said blade assembly means includes a plurality of cutting blades having outermost free ends and inner fixed ends, said cutting blades being mounted for rotation about a generally vertical axis,
said housing means having discharge means being disposed at a position radially outward from said vertical axis adjacent the outermost tips of said cutting blades,
said blade assembly means further includes flow means for causing an air flow through said housing means for moving the vegetation through said housing means,
said housing means including a circumferentially extending wall positioned in surrounding relationship to said blade assembly means, and
said discharge means includes a plurality of openings in said wall disposed radially beyond said outermost tips of said cutting blades.

2. The mulcher according to claim 1 wherein said blade assembly means includes hub means for supporting said fixed ends of said cutting blades, said hub means having a plurality of upper fan blades for creating said air flow.

3. The mulcher according to claim 2 wherein said upper fan blades are disposed in a generally vertical plane and are radially arranged on said hub means.

4. The mulcher according to claim 2 wherein said hub means includes a plurality of pins, said inner fixed ends of cutting blades being pivotally mounted on said plurality of pins.

5. The mulcher according to claim 1 further comprising adjustment means for adjusting the size of said discharge means.

6. The mulcher according to claim 5 wherein said wall means includes a bowl mounted within said housing means.

7. The mulcher according to claim 6 wherein said adjustment means includes a handle operatively affixed to said bowl, said handle extending through said housing means to a position exterior of said housing means.

8. The mulcher according to claim 1 wherein said hopper includes baffle means for guiding the flow of material from said upper inlet to said plurality of cutting blades.

9. The mulcher according to claim 8 wherein said baffle means includes a plurality of spaced baffle plates mounted in a downward sloped orientation in said housing means.

10. A mulcher for shredding vegetation comprising
housing means including an upright upper hopper, said hopper having an upper inlet for introducing vegetation to be shredded,
a plurality of cutting blades being mounted for rotation about a substantial vertical axis within said housing means at a position beneath said upper hopper for shredding vegetation being introduced,
said housing means including a bowl member having a plurality of discharge openings disposed radially beyond said plurality of blades for discharging material being shredded, and
said plurality of discharge openings having at least a portion of said openings being disposed above said plurality of cutting blades.

11. The mulcher according to claim 10 wherein said plurality of cutting blades create a vertical air flow within said housing means for recirculating the vegetation being shredded through said plurality of cutting blades and for discharging the vegetation through said plurality of discharge openings.

12. The mulcher according to claim 10 wherein said housing means includes an outer continuous wall surrounding said plurality of cutting blades adjacent said bowl member, said outer wall being spaced from said inner wall for creating a discharge passage therebetween, said plurality of discharge openings being positioned through said inner wall.

13. The mulcher according to claim 12 wherein said bowl member is positioned within said housing means adjacent said inner wall, said bowl member having a plurality of control openings corresponding to the plurality of said plurality of discharge openings, and means for shifting said bowl member relative to said housing means for varying the effective size of the openings of said plurality of discharge openings and said plurality of control openings.

14. The mulcher according to claim 13 wherein said means for shifting said bowl includes a handle extending outward from said housing means for exterior access.

15. A mulcher for shredding vegetation comprising
housing means having an upper hopper for introducing vegetation to be shredded,
blade assembly means being mounted in said housing means beneath said upper hopper for shredding vegetation being introduced,
said housing means having discharge openings for discharging the shredded vegetation,
said blade assembly means having hub means, said hub means having a lower hub and rigid upper hub, said lower hub having a plurality of upright retention pins, said rigid upper hub being separable from said lower hub,
said blade assembly further including a plurality of removable cutting blades being pivotally mounted on said upright retention pins for rotation about a vertical axis,
said upper hub having holes for removably receiving said upright pins,
said plurality of discharge openings being circumferentially arranged beyond the radial tips of said plurality of cutting blades.

16. The mulcher according to claim 15 wherein said lower hub includes means for limiting the pivotal movement of said plurality of blades.

17. The mulcher according to claim 16 wherein said means for limiting the pivotal movement includes raised portions on said lower hub.

18. The mulcher according to claim 17 wherein said raised portions are a plurality of ridges, said ridges contacting said upper hub for creating a blade receiving space between said lower and upper hubs.

19. The mulcher according to claim 15 wherein said upper hub includes a plurality of upright fan blades for creating a circulating flow through said housing means.

* * * * *